(12) United States Patent
Zuo et al.

(10) Patent No.: US 11,892,091 B2
(45) Date of Patent: Feb. 6, 2024

(54) TWO-DIMENSIONAL MOTOR AND SERVO VALVE

(71) Applicants: ZHEJIANG UNIVERSITY CITY COLLEGE, Hangzhou (CN); CHINA UNIVERSITY OF MINING AND TECHNOLOGY, Xuzhou (CN)

(72) Inventors: Qiang Zuo, Hangzhou (CN); Haigang Ding, Xuzhou (CN); Zhuhua Deng, Hangzhou (CN); Ziwen Sang, Xuzhou (CN); Qianqian Lu, Hangzhou (CN); Anping Wan, Hangzhou (CN); Wei Shao, Hangzhou (CN); Pengfei Wang, Hangzhou (CN)

(73) Assignees: ZHEJIANG UNIVERSITY CITY COLLEGE, Hangzhou (CN); CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 270 days.

(21) Appl. No.: 17/324,137

(22) Filed: May 19, 2021

(65) Prior Publication Data
US 2022/0333711 A1    Oct. 20, 2022

(30) Foreign Application Priority Data
Apr. 15, 2021   (CN) .......................... 202110404191.8

(51) Int. Cl.
*F16K 31/04*        (2006.01)
*H02K 11/21*        (2016.01)
*F16K 37/00*        (2006.01)
*H02K 26/00*        (2006.01)

(52) U.S. Cl.
CPC .......... *F16K 31/04* (2013.01); *F16K 37/0041* (2013.01); *H02K 11/21* (2016.01); *H02K 26/00* (2013.01)

(58) Field of Classification Search
CPC ..... F16K 31/04; F16K 37/0041; H02K 11/21; H02K 26/00
See application file for complete search history.

(56) References Cited

U.S. PATENT DOCUMENTS 9,970,464 B1 *  5/2018  Ruan ................... F15B 13/0433

* cited by examiner

*Primary Examiner* — Eric Keasel
(74) *Attorney, Agent, or Firm* — Daniel M. Cohn; Howard M. Cohn

(57) ABSTRACT

A two-dimensional motor and a servo valve are provided. The two-dimensional motor includes a stator and a rotator arranged coaxially. The stator is enclosed in the rotor. The stator and the rotor are spaced along a radial direction of the rotor. A size of the stator along an axial direction is greater than a size of the rotor along the axial direction. The rotor is, without bearing support, directly connected to an external mechanism. The rotor is swung at a predetermined angle, such that the external mechanism can drive the rotor to move along an axial direction of the rotor relative to the stator.

11 Claims, 5 Drawing Sheets

TWO-DIMENSIONAL MOTOR AND SERVO VALVE

CROSS REFERENCE

The present application claims priority of Chinese Patent Application No. 202110404191.8 filed on Apr. 15, 2021, in the China National Intellectual Property Administration, the entire contents of which are hereby incorporated by reference in its entirety.

TECHNICAL FIELD

The present disclosure relates to the field of motor technologies, and in particular to a two-dimensional motor and a servo valve.

BACKGROUND

A servo valve is both an electro-hydraulic conversion element and a power amplifying element, which connects the electrical part with the hydraulic part to realize the conversion and amplification of electro-hydraulic signals. The performance of the servo valve largely determines the performance of the whole electro-hydraulic control system. Compared with a conventional servo valve, a two-dimensional servo valve has many advantages such as high flow rate, small volume, high frequency response, strong anti-pollution ability, simple structure, low cost, etc.

However, in the current two-dimensional servo valve, a transmission mechanism is generally drived through a motor, and the transmission mechanism drives a valve main body of the servo valve to move, which may lead to electric-mechanical conversion complex, contact wear, high pressure dynamic seal and many other problems.

SUMMARY OF THE DISCLOSURE

The present disclosure provides a two-dimensional motor and a servo valve.

A technical solution adopted by the present disclosure is to provide a two-dimensional motor including a stator and a rotator arranged coaxially. The stator is enclosed in the rotor; the stator and the rotor are spaced along a radial direction of the rotor; a size of the stator along an axial direction is greater than a size of the rotor along the axial direction; the rotor is connected to an external mechanism; the rotor is swung at a predetermined angle, and the external mechanism is capable of driving the rotor to move along an axial direction of the rotor relative to the stator.

Another technical solution adopted by the present disclosure is to provide a servo valve including a valve main body and a two-dimensional motor including: a stator and a rotator arranged coaxially. The stator is enclosed in the rotor; the stator and the rotor are spaced along a radial direction of the rotor; a size of the stator along an axial direction is greater than a size of the rotor along the axial direction; the rotor is connected to an external mechanism; the rotor is swung at a predetermined angle, and the external mechanism is capable of driving the rotor to move along an axial direction of the rotor relative to the stator; the valve main body includes a mandrel connected to the two-dimensional motor; the two-dimensional motor is capable of driving the mandrel to rotate; the mandrel is configured to cooperate with other mechanisms to convert at least a portion of rotational force of the mandrel into a pushing force along an axial direction of the mandrel, such that the mandrel is capable of driving the rotor to move relative to the stator along the axial direction of the rotor.

BRIEF DESCRIPTION OF THE DRAWINGS

In order to more clearly describe the technical solutions in the embodiments of the present disclosure, the following will briefly introduce the drawings required in the description of the embodiments. Obviously, the drawings in the following description are only some embodiments of the present disclosure. For a person skilled in the art, other drawings can be obtained based on these drawings without creative work.

DETAILED DESCRIPTION

The following will be a clear and complete description of the technical solutions in the embodiments of the present disclosure in conjunction with the accompanying drawings in the embodiments of the present disclosure. Obviously, the described embodiments are only a part of the embodiments of the present disclosure, and not all of them. Based on the embodiments in the present disclosure, all other embodiments obtained by a person skilled in the art without creative work fall within the scope of the present disclosure.

Terms of "first" and "second" in the present disclosure are used for descriptive purposes only and are not to be construed as indicating or implying relative importance or implicitly specifying the number of technical features indicated. In the description of the present disclosure, terms of "plurality" mean at least two, such as two, three, etc., unless otherwise expressly and specifically limited. In addition, terms of "include" and "have", and any variations thereof, are intended to cover non-exclusive inclusion. For example, a process, a method, a system, a product or an apparatus including a series of steps or units is not limited to the listed steps or units, but optionally also includes steps or units that are not listed, or optionally also includes other steps or units that are inherent to the process, method, product or apparatus.

Figure 1:
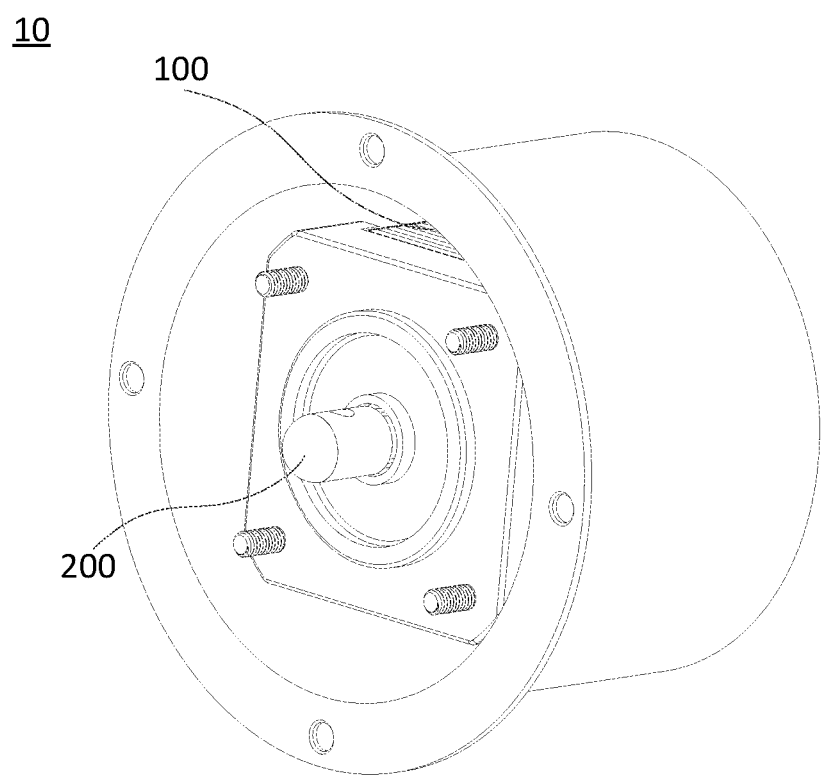
FIG. 1 is a perspective structural schematic view of a two-dimensional motor according to an embodiment of the present disclosure.
Figure 2:
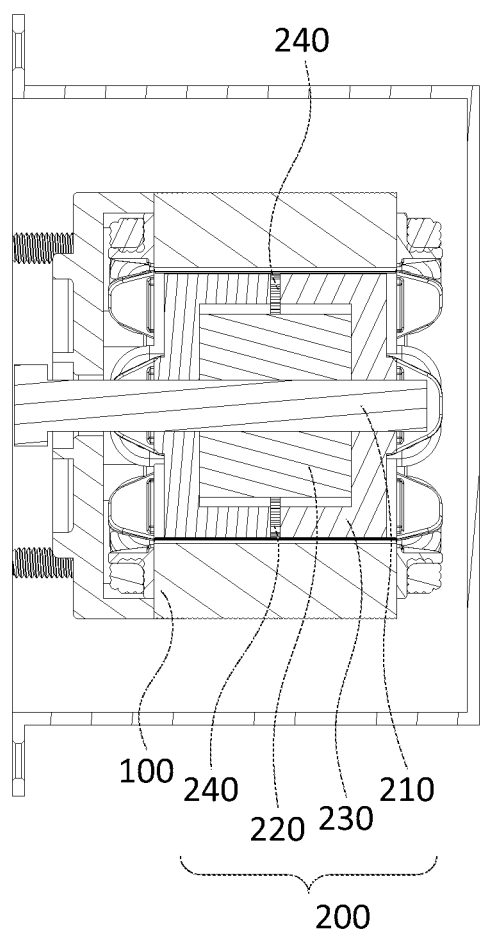
FIG. 2 is a cross-sectional structural schematic view of a two-dimensional motor according to an embodiment of the present disclosure.
Figure 3:
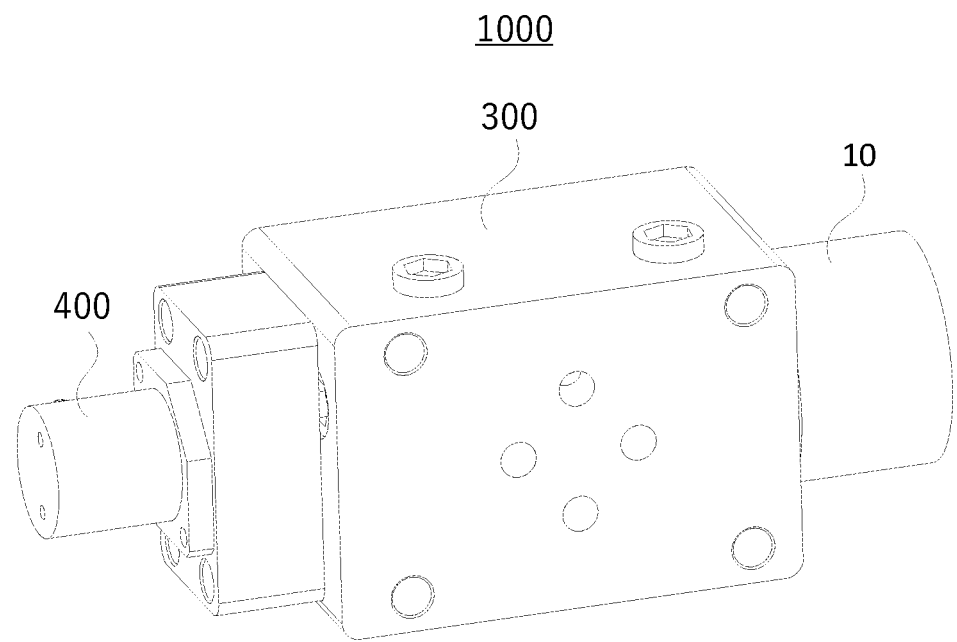
FIG. 3 is a perspective structural schematic view of a servo valve according to an embodiment of the present disclosure.

The present disclosure provides a two-dimensional motor, as shown in FIG. 1 and FIG. 2. In the embodiment, the two-dimensional motor 10 includes a stator 100 and a rotor 200. The stator 100 is enclosed in the rotor 200. The stator 100 and the rotor 200 are arranged coaxially. The stator 100 and the rotor 200 are spaced along a radial direction of the rotor 200. The size of the stator 100 along an axial direction is greater than the size of the rotor 200 along the axial direction. The rotor 200 is connected to an external mechanism. The rotor 200 is swung at a predetermined angle, such that the external mechanism may drive the rotor 200 to move along the axial direction of the rotor 200 relative to the stator 100. In a conventional servo valve, a valve main body is driven by a motor to rotate. However, an axial movement of the valve main body exists during operation, and a rotor and a stator in the current motor are relatively fixed in position along the axial direction, such that a relative displacement between the rotor and the stator along the axis cannot be achieved. Therefore, the motor is generally required to drive the valve main body through a transmission mechanism. In the present disclosure, the rotor 200 can move along the axial direction of the rotor 200 relative to the stator 100, such that the two-dimensional motor 10 can directly drive the valve main body of the servo valve. In this way, a transmission mechanism may be omitted, an overall structure of the servo valve may be simplified, difficulty of preparation may be reduced, a process of electrical-mechanical conversion may be simplified, contact wear may be reduced, occurrences of problems such as high-pressure dynamic sealing may be limited, and service life of the servo valve may be extended. Moreover, by virtue of the direct drive of the two-dimensional motor 10, the two-dimensional motor may have a smaller rotational angle, improving dynamic response of the servo valve.

In this embodiment, the rotor 200 includes a rotor shaft 210, a rotor core 220 enclosing the rotor shaft 210, a rotor winding 230 enclosing the rotor core 220, and a magnetic steel 240 embedded in the rotor winding 230. The stator 100 encloses the rotor winding 230 to form an internal-rotor motor for easy connection to the valve main body.

In this embodiment, the two-dimensional motor 10 may be a wet motor, which can improve heat dissipation of the two-dimensional motor 10 and improve driving efficiency of the two-dimensional motor 10.

Figure 4:
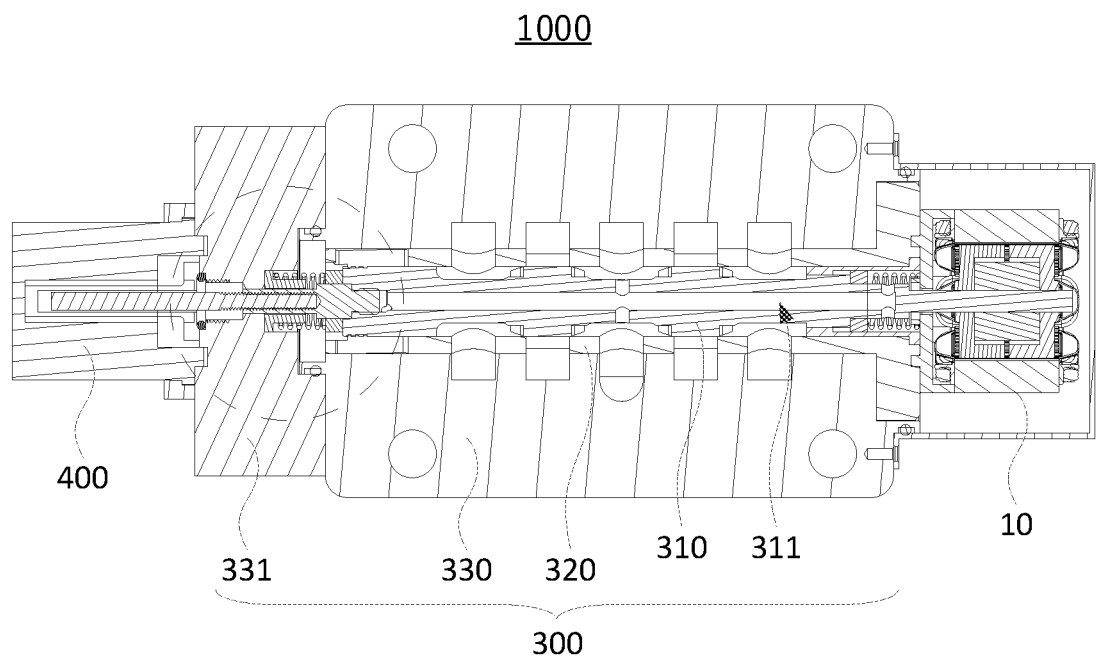
FIG. 4 is a cross-sectional structural schematic view of a servo valve according to an embodiment of the present disclosure, FIG. 4A and FIG. 4B each is lateral sectional view of the motor of FIG. 4 taken along line A-A thereof.
Figure 4A:
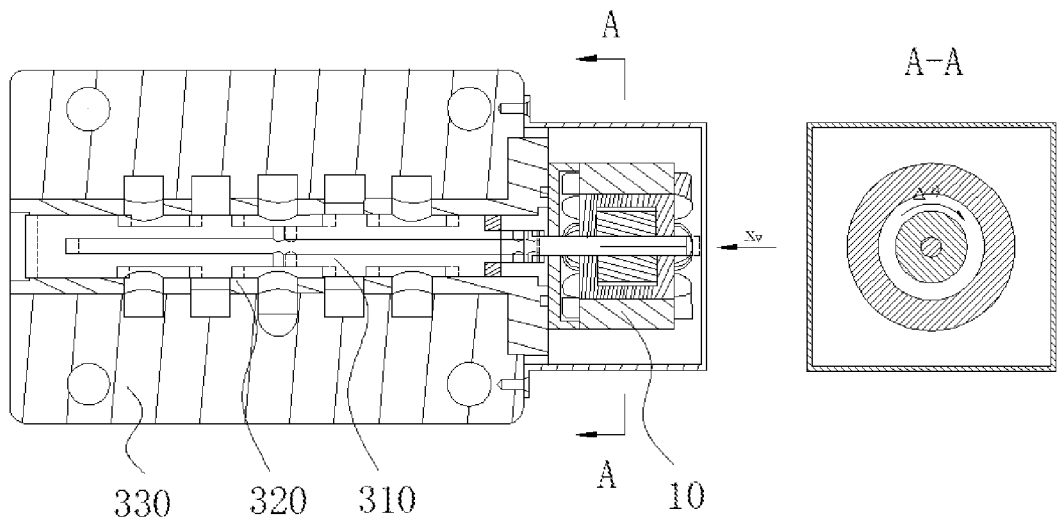
Figure 4B:
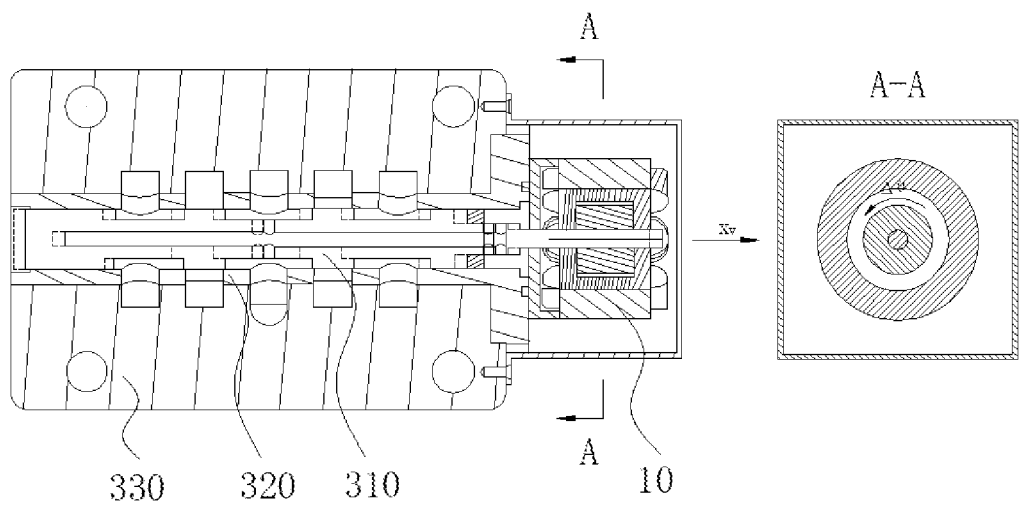

In this embodiment, the static pressure resistance of the two-dimensional motor 10 may be 33 MPa to 37 MPa, such as 33 MPa, 35 MPa, or 37 MPa, etc. Please referring to FIG. 4A and FIG. 4B, the angular displacement Δθ of the motor 10 may be −3.5° to 3.5°, corresponding to a displacement of a mandrel 310 (as shown in FIG. 4) of −1 mm to +1 mm. The frequency response of the two-dimensional motor 10 may be 280 Hz to 320 Hz, such as 280 Hz, 300 Hz or 320 Hz, etc. The resolution of the two-dimensional motor 10 can be 4800 P/r to 5200 P/r, such as 4800 P/r, 5000 P/r or 5200 P/r, etc. In this way, the operating efficiency of the two-dimensional motor 10 may be further ensured, and a better control effect may be achieved with the valve main body.

In this embodiment, the two-dimensional motor 10 may further include a zeroing mechanism (not shown in the drawings) configured to make the rotor 200 reset to an initial zero position after the two-dimensional motor 10 is powered off, such that the valve main body may be driven to reset.

The zeroing mechanism is connected to the rotor 200 and protrudes outside a housing of the two-dimensional motor 10 to facilitate the zeroing setting of the two-dimensional motor 10.

The present disclosure further provides a servo valve, as shown in FIGS. 1 to 4. In the embodiment, the servo valve 1000 includes a valve main body 300 and the two-dimensional motor 10. For the structure of the two-dimensional motor 10, reference may be made to embodiment of the two-dimensional motor 10 above, which will not be repeated here.

In this embodiment, the valve main body 300 includes a mandrel 310 connected to the two-dimensional motor 10, such that the two-dimensional motor 10 may drive the mandrel 310 to rotate. The mandrel 310 may cooperate with other mechanisms to convert at least a portion of rotational force of the mandrel 310 into a pushing force along an axial direction of the mandrel 310, such that the mandrel 310 may drive the rotor 200 to move relative to the stator 100 along the axial direction of the rotor 200. During the movement of the rotor 200 relative to the stator 100, the projection of the rotor 200 along the radial direction of the rotor 200 and that of the stator 100 overlap at least partially, such that the rotor 200 does not exceed the action range of the magnetic field of the stator 100, thereby ensuring the normal operation of the two-dimensional motor 10.

In this embodiment, the valve main body 300 further includes a valve body 330 enclosing a valve sleeve 320. The valve body 330 is arranged with an end cap 331 at an end near a displacement detection mechanism 400. A first cavity is defined among the end cap 331, the valve body 330 and the mandrel 310. A second cavity is defined among the two-dimensional motor 10, the valve body 330 and the mandrel 310. The mandrel 310 is formed with an overflow channel 311 and a valve port (not shown in the drawings). The two-dimensional motor 10 drives the mandrel 310 to rotate, causing the valve port to open or close, such that a hydraulic pressure difference between two ends of the mandrel 310 is generated, and the mandrel 310 moves along the axial direction of the mandrel 310 under the action of the hydraulic pressure difference.

In this embodiment, the mandrel 310 is formed with an extension configured as the rotor shaft 210 of the rotor 200. With the extension of the mandrel 310 configured directly as the rotor shaft 210, the whole structure of the servo valve 1000 may be simpler and more compact, and the direct driving of the mandrel 310 by the two-dimensional motor 10 may be achieved.

In this embodiment, the valve main body 300 further includes the valve sleeve 320 enclosing the mandrel 310. The mandrel 310 and the valve sleeve 320 abut against each other and can slide relative to each other. The stator 100 is fixedly connected to the valve sleeve 320. In this way, co-axiality of the stator 100 and the rotor 200 of the two-dimensional motor 10 may be improved, the magnetic field of the stator 100 on the rotor 200 may be more uniform, and the stability of the two-dimensional stability of the work of the motor 10 may be improved.

In this embodiment, the spacing between the mandrel 310 and the valve sleeve 320 along the radial direction is less than 10 microns, such that the displacement of the rotor 200 in the radial direction may be less than 10 microns, such as 10 microns, 5 microns, or 1 micron, etc.

In this embodiment, the servo valve 1000 may further include the displacement detection mechanism 400 connected to an end of the mandrel 310 away from the two-dimensional motor 10 for detecting the displacement of the mandrel 310. With the displacement detection mechanism 400, the disadvantage that the wet motor is not easy to install an encoder may be avoided, and the displacement of the mandrel 310 may be controlled more accurately to improve the operating accuracy of the servo valve 1000.

Figure 5:
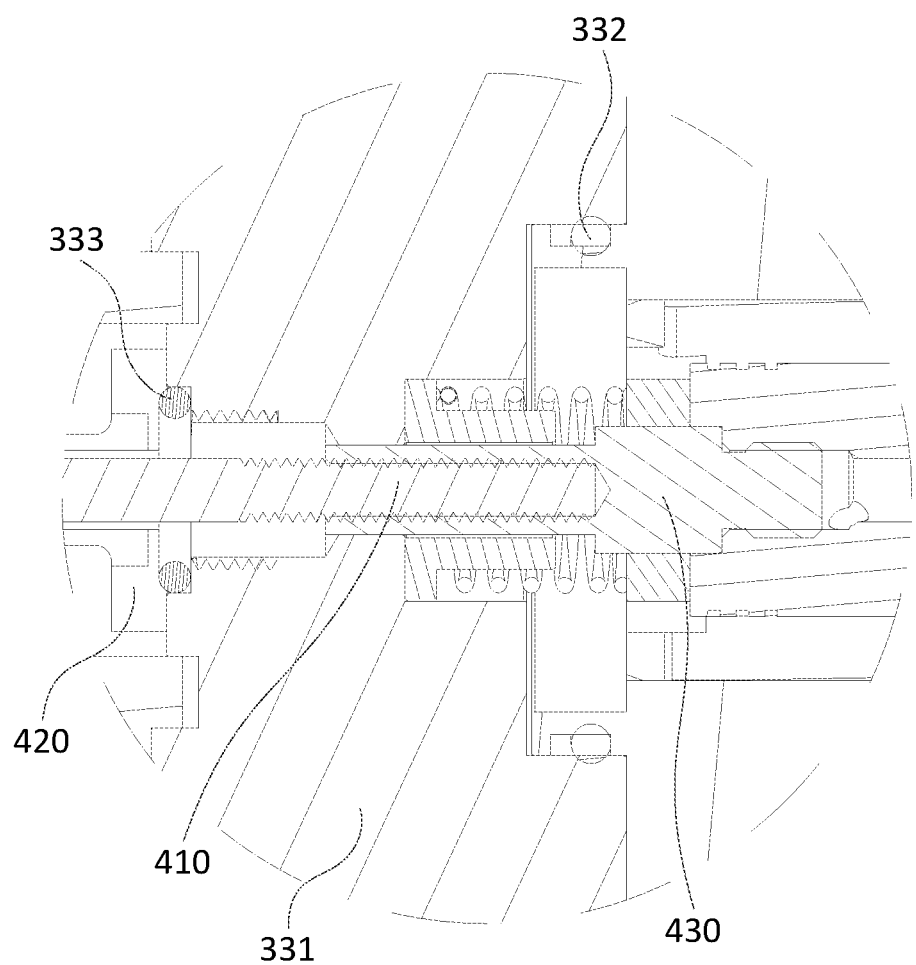
FIG. 5 is a cross-sectional schematic view of a displacement detection mechanism in a servo valve according to an embodiment of the present disclosure.

Further referring to FIG. 5, in this embodiment, the displacement detection mechanism 400 includes a linear variable differential transformer (LVDT) armature 410 and a sleeve 420. The LVDT armature 410 is fixedly connected to the mandrel 310. The sleeve 420 is fixedly connected to the valve sleeve 320. The two-dimensional motor 10 further includes a drive controller (not shown in the drawings). The LVDT armature 410 is electrically connected to the drive controller to enable the drive controller to control the stator 100 and rotor 200 based on the detection structure of the displacement detection mechanism 400.

In this embodiment, the high-pressure resistance of the LVDT armature 410 may be 33 MPa to 37 MPa, such as 33 MPa, 35 MPa or 37 MPa, etc., which can further ensure the detection efficiency of the displacement detection mechanism 400.

In this embodiment, the LVDT armature 410 may be fixedly connected to the mandrel 310 through a connection shaft 430. The LVDT armature 410 is formed with external threads, and the connection shaft 430 is formed with internal threads. The LVDT armature 410 is threadedly connected to the connection shaft 430, such that the connection between the LVDT armature 410 and the connection shaft 430 may be more solid.

In this embodiment, the sleeve 420 is formed with external threads, and the end cap 331 is formed with internal threads. The sleeve 420 is threadedly connected to the end cap 331, such that the connection between the sleeve 420 and the end cap 331 may be more solid.

In this embodiment, a first seal ring 332 may be arranged between the valve body 330 and the end cap 331, and a second seal ring 333 may be arranged between the sleeve body 420 and the end cap 331. In this way, the sealing between the valve body 330 and the end cap 331 and that between the sleeve body 420 and the end cap 331 may be improved.

In other embodiments, the two-dimensional motor 10 may also be a dry motor or the like for easy installation. The two-dimensional motor 10 may further include an encoder (not shown in the drawings) connected to the rotor shaft 210 and capable of detecting the displacement of the mandrel 310.

In this embodiment, a hydraulic chamber may be defined within the servo valve 1000. Fluid within the hydraulic chamber generates hydraulic pressure during the rotation of the mandrel 310 to create a pushing force along the axial direction of the mandrel 310. The servo valve 1000 may further include a pressure feedback mechanism for feeding the hydraulic pressure back to the rotor 200.

In this embodiment, a flow channel may be formed in the servo valve 1000 with a nozzle arranged therein. A port of the flow channel is in conduction with the hydraulic chamber, and the other port is arranged against the rotor 200. The hydraulic pressure is generated during the rotation of the mandrel 310, causing the liquid to be ejected from the nozzle in a direction tangential to the axial direction of the rotor 200 to accelerate the rotation of the rotor 200.

The above is only an implementation of the present disclosure, not to limit the scope of the present disclosure. Any equivalent structure or equivalent process transformation made by using the content of the specification of the present disclosure and the accompanying drawings, or directly or indirectly applied in other related technical fields, are included in the scope of the present disclosure.

What is claimed is:

1. A servo valve, comprising a valve main body and a motor comprising:
a stator and a rotator arranged coaxially; wherein the stator envelopes the rotor; the stator and the rotor are spaced along a radial direction of the rotor; a size of the stator along an axial direction is greater than a size of the rotor along the axial direction; a rotor shaft of the rotor is extending to an outside of the stator and is capable of swinging at an angle relative to an axial direction of the motor, and the rotor is configured to be driven to move along an axial direction of the rotor relative to the stator;
wherein the valve main body comprises a mandrel connected to the motor; the motor is capable of driving the mandrel to rotate; the mandrel is configured to convert at least a portion of rotational force of the mandrel into a pushing force along an axial direction of the mandrel, such that the mandrel is capable of driving the rotor to move relative to the stator along the axial direction of the rotor.

2. The servo valve according to claim 1, wherein the mandrel is formed with an extension configured as the rotor shaft of the rotor.

3. The servo valve according to claim 1, wherein the valve main body further comprises a valve sleeve enclosing the mandrel; the stator is fixedly connected to the valve sleeve.

4. The servo valve according to claim 1, wherein the motor is a dry motor or a wet motor; the servo valve further comprises a displacement detection mechanism connected to an end of the mandrel away from the motor for detecting displacement of the mandrel.

5. The servo valve according to claim 4, wherein the valve main body further comprises a valve sleeve enclosing the mandrel; the displacement detection mechanism comprises a linear variable differential transformer (LVDT) armature and a sleeve; the LVDT armature is fixedly connected to the mandrel; the sleeve is fixedly connected to the valve sleeve; the motor further comprises a drive controller; the LVDT armature is electrically connected to the drive controller.

6. The servo valve according to claim 5, wherein a spacing between the mandrel and the valve sleeve along a radial direction is less than 10 microns, such that displacement of the rotor in the radial direction is less than 10 microns.

7. The servo valve according to claim 1, wherein a hydraulic chamber is defined within the servo valve; fluid within the hydraulic chamber generates hydraulic pressure during rotation of the mandrel to create a pushing force along the axial direction of the mandrel; the servo valve further comprises a pressure feedback mechanism for feeding the hydraulic pressure back to the rotor.

8. A servo valve, comprising a valve main body and a motor comprising:
a stator defining a receiving space in which a rotor having a shaft is rotationally disposed therein, wherein the shaft extends to an outside of the stator and can be pushed to move from a first position to a second position, and returned to the first position when an external force is lifted;
the valve main body comprising a mandrel interconnected to the shaft of the rotor such that the mandrel can be driven to rotate simultaneously with the shaft of the rotor; and
wherein the mandrel is configured to convert a least a portion of the rotational movement of the mandrel into an axial movement such that the shaft of the rotor can be driven to move axially between the first and the second position, and a rotor shaft of the rotor is capable of swinging at an angle relative to an axial direction of the motor.

9. The servo valve according to claim 8, wherein the angle ranges from −3.5° to 3.5°.

10. The servo valve according to claim 8, wherein the mandrel is formed with an extension configured as the rotor shaft of the rotor.

11. The servo valve according to claim 8, wherein the valve main body further comprises a valve sleeve enclosing the mandrel; the stator is fixedly connected to the valve sleeve.

* * * * *